Patented Dec. 16, 1930

1,784,903

UNITED STATES PATENT OFFICE

SAMUEL M. McELVAIN, OF MADISON, WISCONSIN

PIPERIDINE DERIVATIVE AND PROCESS OF PRODUCING IT

No Drawing.   Application filed March 30, 1927.   Serial No. 179,725.

My invention relates to certain piperidine derivatives, and the process of producing them.

The object of the invention is to produce certain synthetic substances which are effective as local anesthetics. Some of these synthetic substances are very highly effective as local anesthetics, and at the same time possess sufficiently low toxicity and sufficiently low irritating properties to make them safely and conveniently practical for clinical use. The various substances which come under my generic invention as hereinafter defined vary in these several properties; for my invention includes quite a large number of compounds.

These compounds are piperidine derivatives in which the nitrogen-joined hydrogen atom of piperidine has been replaced by a radicle of the general formula

in which $x$ is an integer and $R'$ is an aromatic radicle; and in which one of the carbon-joined hydrogen atoms of piperidine has been replaced by an organic radicle; and they may be either the free bases or salts formed from them with acids.

Such a piperidine derivative includes a substance indicated by the following general formula:

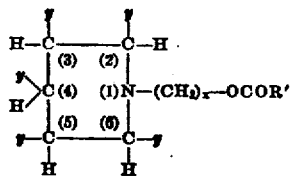

in which $R'$ is an aromatic radicle and $x$ is an integer as stated above, $y$ in four of the five places where it appears is a hydrogen atom, and $y$ in the fifth place where it appears is an organic radicle.

The particular $y$ which is an organic radicle may be in any one of the five places where $y$ appears in the formula. That is, counting the nitrogen atom as the 1 position, the carbon-joined hydrogen atom which is replaced by an organic radicle may be in the 2 position, the 3 position, or the 4 position; it being obvious that the 6 position and the 5 position indicated are in reality the same as the 2 position and the 3 position respectively.

The organic radicle at such one $y$ may be of a variety of types, but desirably contains an aliphatic group of the paraffin series; as for instance by being a methyl group, an ethyl group, a propyl group, or a carbethoxy group. It desirably contains an alkyl group having less than four (4) carbon atoms.

In the above formula, the group $(CH_2)_x$ does not necessarily indicate strictly the methylene unit taken some integral number of times, but is intended to cover broadly a radicle in which the relation of the total carbon to the total hydrogen is in the proportion indicated. That is, assuming for instance that $x$ equals 3, the expression $(CH_2)_x$ is intended to include not only a bivalent radicle of three methylene groups, but also other bivalent radicles having the same proportion of total hydrogen and total carbon, such as a methyl substituted ethylene group.

Further, while the $x$ in this formula may be any practically possible integer, I prefer that it be a plural integer less than six (6), desirably three (3).

The radicle $R'$ is an aromatic radicle. Indeed, I prefer that $R'$ shall be a phenyl group, either unsubstituted or substituted; such for instance as an amino-substituted phenyl, and with the amino group itself either unsubstituted or mono-alkyl or di-alkyl substituted.

A convenient general process of preparing substances such as shown in the foregoing formula is the following:

A halogen-substituted alcohol is caused to react with either one or the other of the following substances: (a) a substituted piperidine; and (b) a benzoylating agent, such for instance as benzoic anhydride, or a benzoyl halide. For the substituted phenyl compounds, a convenient benzoylating agent is a nitro benzoyl chloride. The compound obtained as a result of the foregoing reaction is then caused to react with the other of said two substances named above—that is, with either the substituted piperidine or with the benzoylating agent, according to which one it was that did not take part in the first-named reaction with the halogen substituted alcohol. If the compound resulting from the first-named reaction given above is directly available, without being specially prepared, it can be used as the bases for the second reaction given above; and my claims are intended to cover the second reaction alone as well as the sequence of the two reactions. If the benzoylating agent used is a nitro benzoyl chloride, the result of the second reaction given above should be followed by a third or subsequent step, of reducing the substituted piperidino-alkyl nitro-benzoate obtained as the result of the second reaction to a substituted piperidino-alkyl amino-benzoate.

In any case, the result of the second or third reaction is a base, of the general formula given above. In many instances, this base is relatively insoluble in water, or has too low a water-solubility to be conveniently available clinically. To increase the water-solubility of the substance, it is desirably transformed into a salt, by the combination with it of an acid. Various inorganic acids can be used, such as hydrochloric acid, and various organic acids, such as lactic acid. If hydrochloric acid is used, the salt formed has the following general formula:

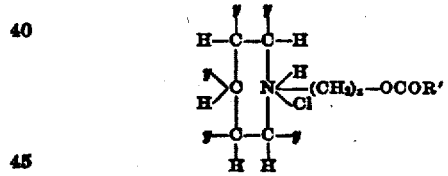

in which $x$, $y$, and $R'$ have the same significance as before. These salts are quite soluble in water, and are the desirable form in which the substances are used as anesthetics. However, my invention is intended to cover both the bases and the salts.

In some cases, the desired hydrochloride of the tertiary amine, as first obtained, is contaminated with some of the hydrochloride of the secondary amine—i. e., with some of the hydrochloride of the unchanged piperidine. To purify it, an aqueous solution of it is treated with an excess of alkali, such as sodium hydroxide. The resultant alkaline suspension of the free base is shaken with benzoyl chloride, whereby any unchanged secondary amine present is converted to an amide. The aqueous suspension is extracted with ether; and the desired tertiary amine is precipitated as the hydrochloride from the ether solution.

I give below a number of examples of compounds embodying my invention, and their method of preparation. In these, temperatures are given in the centigrade scale.

*Example 1*

Gamma - (2 - methyl - piperidino) - propyl benzoate hydrochloride,

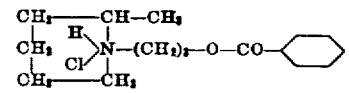

Fifteen g. of 2-methyl piperidine and 15 g. of gamma-chloro-propyl benzoate are mixed, and heated under a reflux at a temperature of 120–140° for 30–40 minutes. The reaction mixture is then cooled, and treated with 100 c. c. of ether, and the precipitated secondary amine hydrochloride (i. e., some of the hydrochloride of the unchanged piperidine) filtered off. Hydrogen chloride gas is passed into the filtrate, and crude gamma-(2 methyl-piperidino)-propyl benzoate hydrochloride thereby precipitated. The ether is decanted from the precipitate, and the latter is dissolved in 20 c. c. of cold water. This solution is treated with 5 c. c. of 40% sodium hydroxide and 5 c. c. of benzoyl chloride, and the resulting mixture shaken vigorously until the odor of the benzoyl chloride has disappeared. In this manner any unchanged secondary amine is converted into an amide.

The alkaline solution—which contains the free base, gamma-(2-methyl-piperidino)-propyl benzoate in suspension—is extracted with ether, and the ether extract is treated with hydrogen chloride; whereupon the gamma-(2-methyl-piperidino)-propyl benzoate hydrochloride is precipitated. The product is re-crystallized from an alcohol-ether mixture, after which it melts at 167–9°. The yield is about 70% of the theory.

The corresponding beta-(2-methyl-piperidino)-alpha-methyl-ethyl benzoate hydrochloride and beta-(2-methyl-piperidino)-beta-methyl-ethyl benzoate hydrochloride, as well as their free bases, may be prepared in an analogous way to that outlined above for the gamma-(2-methyl-piperidino)-propyl benzoate hydrochloride. Also, the same general method may be used in preparing the analogous hydrochlorides, and their free bases, with the methyl substitution in the 3 and 4 positions of the piperidine nucleus as well as in the 2 position given.

*Example 2*

Gamma - (2 - propyl - piperidino) - propyl benzoate hydrochloride,

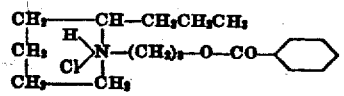

Twelve g. of 2-propyl piperidine (coniine)

and 10 g. of gamma-chloro-propyl benzoate are heated together under a reflux in an oil bath at 140–160° for 30 minutes. The product of the reaction is gamma-(2-propyl-piperidino)-propyl benzoate and an equivalent amount of coniine hydrochloride. The tertiary amine is purified and isolated as the hydrochloride in the same way as that described in Example 1 for the 2-methyl derivative. The gamma-(2-propyl-piperidino)-propyl benzoate hydrochloride melts at 184–186°.

Variations similar to those given under Example 1 may be made to produce the analogous 3-propyl-piperidino and the 4-propyl-piperidino compounds; and also to produce the various types of alkyl benzoates mentioned under Example 1.

*Example 3*

Gamma-(3-methyl-piperidino)-propyl benzoate hydrochloride,

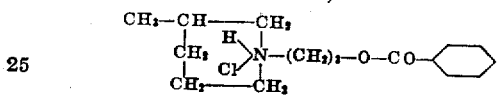

I give two methods of preparing this compound:

A. Ten g. of 3-methyl piperidine and 10 g. of gamma-chloro-propyl benzoate are heated together at 100° on a steam bath for 30 minutes. The reaction mixture is cooled, and treated with 100 c. c. of ether. The secondary amine hydrochloride is filtered from the ether solution of the tertiary amine, and the latter is precipitated as the hydrochloride with hydrogen chloride. The precipitated hydrochloride is re-crystallized from an alcohol-ether mixture. The yield is 10 g., and the product melts at 178–180°.

B. Gamma-(3-methyl-piperidino)-propyl benzoate hydrochloride may also be prepared in the following manner: 20 g. of 3-methyl piperidine and 10 g. of trimethylene chlorohydrin are heated together on a steam bath for 40 minutes. The reaction mixture is treated with 100 c. c. of benzene, and the precipitated 3-methyl piperidine hydrochloride filtered off. To the filtered benzene solution is added 18 g. of benzoyl chloride, and the resulting solution is refluxed for 4 to 5 hours. The gamma-(3-methyl-piperidino)-propyl benzoate hydrochloride separates from the benzene solution during the refluxing, and more completely on cooling. It is re-crystallized from an alcohol-ether mixture.

Process A given above is substantially the same process for the 3-methyl-piperidino compound as is given under Example 1 for the 2-methyl piperidino compound; save that it is not carried through the step of final purification given under Example 1. This is because in the preparation of the 3-methyl piperidino compound, the secondary amine does not remain after the initial reaction as it does in the case of the 2-methyl-piperidino compound. That is, the reaction in the case of the 3-methyl piperidino compound is more complete than is the case with the 2-methyl-piperidino compound under conditions of reaction as described above.

Both of methods A and B under Example 3 can be used for preparing the 2-methyl-piperidino compounds and the 4-methyl-piperidino compounds; save that in preparing the 2-methyl-piperidino compound the step of further purification outlined in Example 1 is desirable.

Further, both of processes A and B given under Example 3 may be used for preparing the various types of alkyl benzoates mentioned under Example 1.

*Example 4*

Beta-(3-methyl-piperidino)-ethyl benzoate hydrochloride,

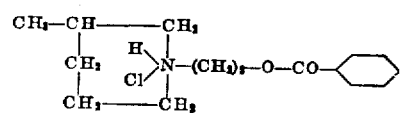

The preparation of this compound is exactly the same as that described in Example 3, both processes A and B, for gamma-(3-methyl-piperidino)-propyl benzoate hydrochloride, except that beta-chloro-ethyl benzoate and ethylene chlorohydrin are used instead of gamma-chloro-propyl benzoate and trimethylene chlorohydrin. Beta-(3-methyl-piperidino)-ethyl benzoate hydrochloride melts at 134–6°.

The analogous 2-methyl piperidino and 4-methyl piperidino compounds may be made in the same general way.

*Example 5*

Gamma-(3-carbethoxy-piperidino)-propyl benzoate hydrochloride,

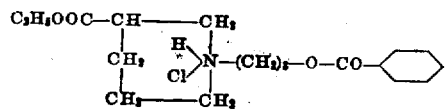

This compound is prepared in exactly the same manner as gamma-(3-methyl-piperidino)-propyl benzoate hydrochloride of Example 3, both processes A and B, except that an equivalent amount of 3-carbethoxy piperidine (ethyl nipecotate) is used instead of the 3-methyl piperidine. It melts at 161–3°.

Various isomeric alkyl benzoates analogous to those mentioned under Example 1 may be made in the same general way; and the carbethoxy groups may be in either the 2 position or the 4 position as well as in the 3 position.

Example 6

Gamma-(3-methyl-piperidino)-propyl para-amino-benzoate hydrochloride,

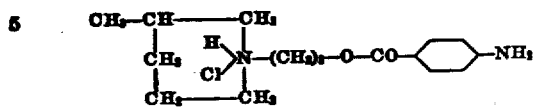

The procedure described in Example 3—B is followed, except that 22 g. of p-nitrobenzoyl chloride is used instead of the 18 g. of benzoyl chloride. The resulting gamma-(3-methyl-piperidino)-propyl p-nitrobenzoate hydrochloride melts at 190–2°. The nitro group of this compound is reduced to an amino group either by iron powder and water with a trace of hydrochloric acid, or by hydrogen and catalytic platinum with alcohol as a solvent. The gamma-(3-methyl-piperidino)-propyl p-amino-benzoate hydrochloride melts at 158–160°.

Isomeric analogues compounds may be made in the same general way; and the methyl group may be in either the 2 position or the 4 position as well as in the 3 position.

Example 7

Gamma-(3-carbethoxy-piperidino)-propyl para-amino-benzoate hydrochloride,

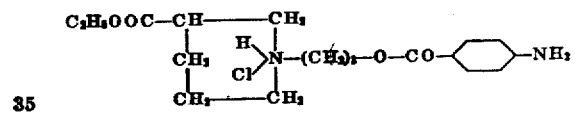

The preparation of this compound is exactly the same as that described in Example 6 for gamma-(3-methyl-piperidino)-propyl p-amino-benzoate hydrochloride, except that an equivalent amount of 3-carbethoxy-piperidine is used instead of 3-methyl-piperidine. The melting point of gamma-(3-carbethoxy-piperidino)-propyl p-nitro-benzoate hydrochloride is 177–9°, and of the gamma-(3-carbethoxy-piperidino)-propyl p-amino-benzoate hydrochloride is 110–112°.

Isomeric analogues, as before, may be made in the same general way; and the carbethoxy group may be in either the 2 position or the 4 position as well as in the 3 position.

Analogous mono-alkyl-amino and di-alkyl-amino benzoate hydrochlorides may also be produced. The mono-alkyl and di-alkyl benzoic acids may be esterified with the halogen-substituted alcohols in the usual manner. The resulting halogenated esters may then be caused to react with the various substituted piperidines mentioned above.

The examples given above are merely examples of the various compounds and processes included in my invention. They show in general the type of variations which the invention includes, but are not given as limitations on the generic invention.

I claim as my invention:—

1. A piperidine derivative including a substance of the general formula

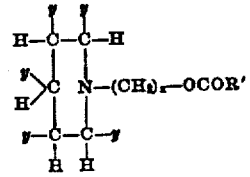

in which R' is an aromatic radicle, $x$ is an integer, and $y$ in one place is an aliphatic group and in each of the four other places is a hydrogen atom.

2. A piperidine derivative as expressed in claim 1, in which $x$ is a plural integer.
3. A piperidine derivative as expressed in claim 1, in which $x$ is a plural integer less than six (6).
4. A piperidine derivative as expressed in claim 1, in which $x$ is three (3).
5. A piperidine derivative as expressed in claim 1, in which R' is a phenyl radicle.
6. A piperidine derivative as expressed in claim 1, in which R' is an amino-substituted phenyl group.
7. A piperidine derivative as expressed in claim 1, in which the $y$ which is an aliphatic group is of the paraffin series.
8. A piperidine derivative as expressed in claim 1, in which the $y$ which is an aliphatic group is an alkyl group.
9. A piperidine derivative as expressed in claim 1, in which the $y$ which is an aliphatic group is an alkyl group having less than four (4) carbon atoms.
10. A piperidine derivative as expressed in claim 1, in which R' is an unsubstituted group.
11. A piperidine derivative as expressed in claim 1, in which the $y$ which is an aliphatic group is an alkyl group and in which R' is an unsubstituted phenyl group.
12. A salt of a piperidine derivative of the formula set forth in claim 1, and an acid.
13. A salt of a piperidine derivative of the formula set forth in claim 1, and an inorganic acid.
14. The hydrochloride of a piperidine derivative of the formula set forth in claim 1.
15. The process of producing substituted piperidino alkyl benzoates of the composition set forth in claim 1, which comprises first causing a reaction of a halogen-substituted alcohol with one of the following two substances: (a) a substituted piperidine in which a carbon-linked hydrogen of piperidine has been replaced by an alkyl group, and (b) a benzoylating agent; and subsequently causing a reaction of the other of such two substances with the result of the first reaction.
16. The process of producing substituted piperidino-alkyl nitro benzoates of the composition set forth in claim 1, which comprises first causing a reaction of a halogen-substituted alcohol with one of the following two substances: (a) a substituted piperidine in which a carbon-linked hydrogen of piperidine has been replaced by an alkyl group, and (b) a nitro benzoyl chloride; and subsequently causing a reaction of the other of such two substances with the result of the first reaction.

17. The process of producing substituted piperidino-alkyl nitro benzoates of the composition set forth in claim 1, which comprises first causing a reaction of a halogen-substituted alcohol with one of the following two substances: (a) a substituted piperidine in which a carbon-linked hydrogen of piperidine has been replaced by an alkyl group, and (b) a nitro benzoyl chloride; and subsequently causing a reaction of the other of such two substances with the result of the first reaction, and subsequently reducing the substituted piperidino-alkyl nitro-benzoate to a substituted piperidino alkyl amino-benzoate.

18. The process of producing substituted piperidino-alkyl benzoates of the composition set forth in claim 1, which comprises causing a reaction of one of the following two substances: (a) a substituted piperidine in which a carbon-linked hydrogen of piperidine has been replaced by an alkyl group, and (b) a benzoylating agent, with the result of the reaction of a halogen-substituted alcohol and the other of such substances.

19. The process of producing substituted piperidino-alkyl benzoates of the composition set forth in claim 1, which comprises causing a reaction of one of the following two substances: (a) a substituted piperidine in which a carbon-linked hydrogen of piperidine has been replaced by an alkyl group, and (b) a nitro benzoyl chloride, with the result of the reaction of a halogen-substituted alcohol and the other of such substances.

20. The process of producing substituted piperidino-alkyl benzoates of the composition set forth in claim 1, which comprises causing a reaction of one of the following two substances: (a) a substituted piperidine in which a carbon-linked hydrogen of piperidine has been replaced by an alkyl group, and (b) a nitro benzoyl chloride, with the result of the reaction of a halogen-substituted alcohol and the other of such substances, and subsequently reducing the substituted piperidino-alkyl nitro-benzoate to a substituted piperidino-alkyl amino-benzoate.

21. A piperidine derivative as expressed in claim 1, in which the $y$ which is an aliphatic group is a methyl group.

22. A piperidine derivative as expressed in claim 1, in which the $y$ which is an aliphatic group is a methyl group and in which R' is a phenyl group.

23. A piperidine derivative as expressed in claim 1, in which the $y$ which is an aliphatic group is a methyl group and in which R' is an amino-substituted phenyl group.

24. A piperidine derivative as expressed in claim 1, in which the $y$ which is an aliphatic group is a methyl group and in which $x$ is three (3).

25. A piperidine derivative as expressed in claim 1, in which the $y$ which is an aliphatic group is a methyl group and in which R' is a phenyl group and in which $x$ is three (3).

26. A piperidine derivative as expressed in claim 1, in which the $y$ which is an aliphatic group is a methyl group and in which R' is an amino-substituted phenyl group and in which $x$ is three (3).

27. A piperidine derivative as expressed in claim 1, in which the $y$ which is an aliphatic group is in the 2 position.

28. A piperidine derivative as expressed in claim 1, in which the $y$ which is an aliphatic group is an alkyl group and is in the 2 position.

29. A piperidine derivative as expressed in claim 1, in which the $y$ which is an aliphatic group is a methyl group and is in the 2 position.

30. A piperidine derivative as expressed in claim 1, in which the $y$ which is an aliphatic group is a methyl group and in which R' is an unsubstituted phenyl group.

31. A piperidine derivative as expressed in claim 1, in which the $y$ which is an organic radicle is a methyl group and is in the 2 position and in which R' is an unsubstituted phenyl group.

32. A piperidine derivative as expressed in claim 1, in which the $y$ which is an aliphatic group is in the 2 position and in which $x$ is three (3).

33. A piperidine derivative as expressed in claim 1, in which the $y$ which is an aliphatic group is an alkyl group and is in the 2 position and in which $x$ is three (3).

34. A piperidine derivative as expressed in claim 1, in which the $y$ which is an aliphatic group is a methyl group and is in the 2 position and in which $x$ is three (3).

35. A piperidine derivative including a substance of the general formula

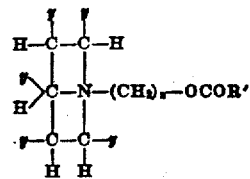

in which R' is an unsubstituted phenyl group, $x$ is an integer, and $y$ in one place is an organic radicle containing an aliphatic group and in each of the four other places is a hydrogen atom.

36. A piperidine derivative as expressed in claim 35, in which $x$ is a plural integer.

37. A piperidine derivative as expressed in claim 35, in which $x$ is a plural integer less than six (6).

38. A piperidine derivative as expressed in claim 35, in which $x$ is three (3).

39. A piperidine derivative as expressed in claim 35, in which the $y$ which is an organic radicle contains an aliphatic group of the paraffin series.

40. A piperidine derivative as expressed in claim 35, in which the $y$ which is an organic radicle contains an alkyl group.

41. A piperidine derivative as expressed in claim 35, in which the $y$ which is an organic radicle contains an alkyl group having less than four (4) carbon atoms.

42. A salt of a piperidine derivative of the formula set forth in claim 35, and an acid.

43. A piperidine derivative as expressed in claim 35, in which the $y$ which is an organic radicle is a methyl group.

44. A piperidine derivative as expressed in claim 35, in which the $y$ which is an organic radicle is a methyl group and is in the 2 position.

In witness whereof I have hereunto set my hand at Indianapolis, Indiana, this 29th day of March, A. D. one thousand nine hundred and twenty seven.

SAMUEL M. McELVAIN.

claim 35, in which $x$ is a plural integer less than six (6).

38. A piperidine derivative as expressed in claim 35, in which $x$ is three (3).

39. A piperidine derivative as expressed in claim 35, in which the $y$ which is an organic radicle contains an aliphatic group of the paraffin series.

40. A piperidine derivative as expressed in claim 35, in which the $y$ which is an organic radicle contains an alkyl group.

41. A piperidine derivative as expressed in claim 35, in which the $y$ which is an organic radicle contains an alkyl group having less than four (4) carbon atoms.

42. A salt of a piperidine derivative of the formula set forth in claim 35, and an acid.

43. A piperidine derivative as expressed in claim 35, in which the $y$ which is an organic radicle is a methyl group.

44. A piperidine derivative as expressed in claim 35, in which the $y$ which is an organic radicle is a methyl group and is in the 2 position.

In witness whereof I have hereunto set my hand at Indianapolis, Indiana, this 29th day of March, A. D. one thousand nine hundred and twenty seven.

SAMUEL M. McELVAIN.

CERTIFICATE OF CORRECTION.

Patent No. 1,784,903.          Granted December 16, 1930, to

SAMUEL M. McELVAIN.

It is hereby certified that error appears in the printed specification of the above numbered patent requiring correction as follows: Page 2, line 15, for the word "bases" read basis; page 3, line 129, for "groups" read group; page 4, line 23, strike out the word "compounds", and line 103, claim 10, before the word "group" insert the word phenyl; and that the said Letters Patent should be read with these corrections therein that the same may conform to the record of the case in the Patent Office.

Signed and sealed this 20th day of January, A. D. 1931.

(Seal)

M. J. Moore,
Acting Commissioner of Patents.

CERTIFICATE OF CORRECTION.

Patent No. 1,784,903.                    Granted December 16, 1930, to

SAMUEL M. McELVAIN.

It is hereby certified that error appears in the printed specification of the above numbered patent requiring correction as follows: Page 2, line 15, for the word "bases" read basis; page 3, line 129, for "groups" read group; page 4, line 23, strike out the word "compounds", and line 103, claim 10, before the word "group" insert the word phenyl; and that the said Letters Patent should be read with these corrections therein that the same may conform to the record of the case in the Patent Office.

Signed and sealed this 20th day of January, A. D. 1931.

(Seal)
                                    M. J. Moore,
                            Acting Commissioner of Patents.